US010130877B2

(12) United States Patent
Blaho (10) Patent No.: US 10,130,877 B2
(45) Date of Patent: *Nov. 20, 2018

(54) REMOTE GAMING AND PROJECTION

(71) Applicant: HEWLETT-PACKARD DEVELOPMENT COMPANY, L.P., Houston, TX (US)

(72) Inventor: Bruce Blaho, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,762

(22) Filed: Jan. 22, 2018

(65) Prior Publication Data
US 2018/0140944 A1    May 24, 2018

Related U.S. Application Data

(63) Continuation of application No. 13/176,044, filed on Jul. 5, 2011, now Pat. No. 9,873,042, which is a continuation of application No. 10/924,402, filed on Aug. 24, 2004.

(51) Int. Cl.
| | |
|---|---|
| A63F 9/24 | (2006.01) |
| A63F 13/26 | (2014.01) |
| A63F 13/32 | (2014.01) |
| A63F 13/40 | (2014.01) |
| A63F 13/33 | (2014.01) |

(52) U.S. Cl.
CPC .............. *A63F 13/26* (2014.09); *A63F 13/10* (2013.01); *A63F 13/32* (2014.09); *A63F 13/33* (2014.09); *A63F 2300/301* (2013.01)

(58) Field of Classification Search
None
See application file for complete search history.

(56) References Cited

U.S. PATENT DOCUMENTS

| | | |
|---|---|---|
| 4,111,421 A | 9/1978 | Mierzwinski |
| 4,372,558 A | 2/1983 | Shimamoto et al. |
| 4,592,546 A | 6/1986 | Fascenda et al. |
| 5,448,263 A | 9/1995 | Martin |
| 5,553,864 A | 9/1996 | Sitrick |
| 5,797,795 A | 8/1998 | Takemoto et al. |
| 5,808,671 A | 9/1998 | Maycock et al. |
| 5,830,065 A | 11/1998 | Sitrick |
| 6,001,016 A | 12/1999 | Walker et al. |
| 6,064,502 A | 5/2000 | Burns et al. |
| 6,084,638 A | 7/2000 | Hare et al. |

(Continued)

OTHER PUBLICATIONS

HB Communications, Inc., Expertise Streaming Media: Streaming Products; http://www.hbcommunications.com/technology_streaming_products.asp (Dwnld Jul. 26, 2004); 1-9.

(Continued)

*Primary Examiner* — Paul A D'Agostino
(74) *Attorney, Agent, or Firm* — Trop, Pruner & Hu PC (57) ABSTRACT

Remote gaming and/or projection are provided. A first device includes a gaming system or presentations associated with its display. The features of the gaming system are accessed over a network and images associated with accessed features and/or associated with presentations of a host's display are then projected onto a client's display. The client and the client's display are remote from the host, the gaming system, and the host's display.

20 Claims, 6 Drawing Sheets

(56) References Cited

U.S. PATENT DOCUMENTS

| | | | |
|---|---|---|---|
| 6,243,772 | B1 | 6/2001 | Ghori et al. |
| 6,306,038 | B1 | 10/2001 | Graves et al. |
| 6,361,437 | B1 | 3/2002 | Walker et al. |
| 6,409,602 | B1 | 6/2002 | Wiltshire et al. |
| 6,425,825 | B1 | 7/2002 | Sitrick |
| 6,738,087 | B2 | 5/2004 | Belkin et al. |
| 6,749,510 | B2 | 6/2004 | Giobbi |
| 6,795,068 | B1 | 9/2004 | Marks |
| 6,810,528 | B1 | 10/2004 | Chatani |
| 6,824,465 | B2 | 11/2004 | Luciano, Jr. |
| 7,031,473 | B2 | 4/2006 | Morais |
| 7,161,557 | B2 | 1/2007 | Thornton |
| 7,606,872 | B2 | 10/2009 | Stevenson et al. |
| 2001/0044337 | A1 | 11/2001 | Rowe et al. |
| 2002/0045484 | A1 | 4/2002 | Eck et al. |
| 2002/0069417 | A1 | 6/2002 | Kliger et al. |
| 2002/0071557 | A1 | 6/2002 | Nguyen |
| 2002/0107072 | A1 | 8/2002 | Giobbi |
| 2002/0151363 | A1 | 10/2002 | Letovsky et al. |
| 2003/0045359 | A1 | 3/2003 | Leen |
| 2003/0114211 | A1 | 6/2003 | White |
| 2003/0171986 | A1 | 9/2003 | Itkis et al. |
| 2003/0212811 | A1 | 11/2003 | Thornton |
| 2003/0228898 | A1 | 12/2003 | Rowe |
| 2004/0017473 | A1 | 1/2004 | Marks |
| 2006/0188096 | A1 | 8/2006 | Aguilar |
| 2007/0033265 | A1 | 2/2007 | Anderson et al. |
| 2007/0281789 | A1 | 12/2007 | Wiltshire et al. |

OTHER PUBLICATIONS

Omnimedia Technology, Inc., Product Overview—MPEG-4 Digital Video and Audio Streaming; http://www.omt.com/Products/MPEG4/list.htm (Dwnld Jul. 26, 2004); 1-10.

Zygo Digital, Customer Success: Ballistic Missle Defense Test Program; http://www.zygodigital.com/html/success_stories_1.cfm (Dwnld Jul. 26, 2004); 1-3.

REMOTE GAMING AND PROJECTION

CROSS REFERENCE TO RELATED APPLICATIONS

This application is a continuation of U.S. application Ser. No. 13/176,044, filed Jul. 5, 2011, which is a continuation of U.S. application Ser. No. 10/924,402, filed Aug. 24, 2004, both hereby incorporated by reference in their entirety.

BACKGROUND

Some gaming systems permit users to be networked with one another and play against one another. However, the gaming systems still execute locally on each machine or device of each participating user. The same is true for non-networked gaming. That is, with non-networked gaming a user directly sits in front of and interacts with the gaming system in order to play a desired game. This means that bulky and unnecessary equipment is either carried around by a user in order to install and power up in a location that suits the user or means that the user picks a single location to install and power up the gaming system in a location that he/she consistently revisits when game play is desired.

On a related note, there are many instances in which a user would like to share what is appearing on his/her display with one or more others having different display devices. Typically, this is achieved by hardwired connections between the sharing display and a third device called a projection device. The display devices that desire to view the shared display then directly connect or interface to the projection device. The sharing device directly connects and interfaces through hardwired connections to a special projection device. Similar to gaming, the direct connection between a sharing display and a projection device is an inconvenient and cumbersome solution for mobile users.

DETAILED DESCRIPTION

Figure 1:
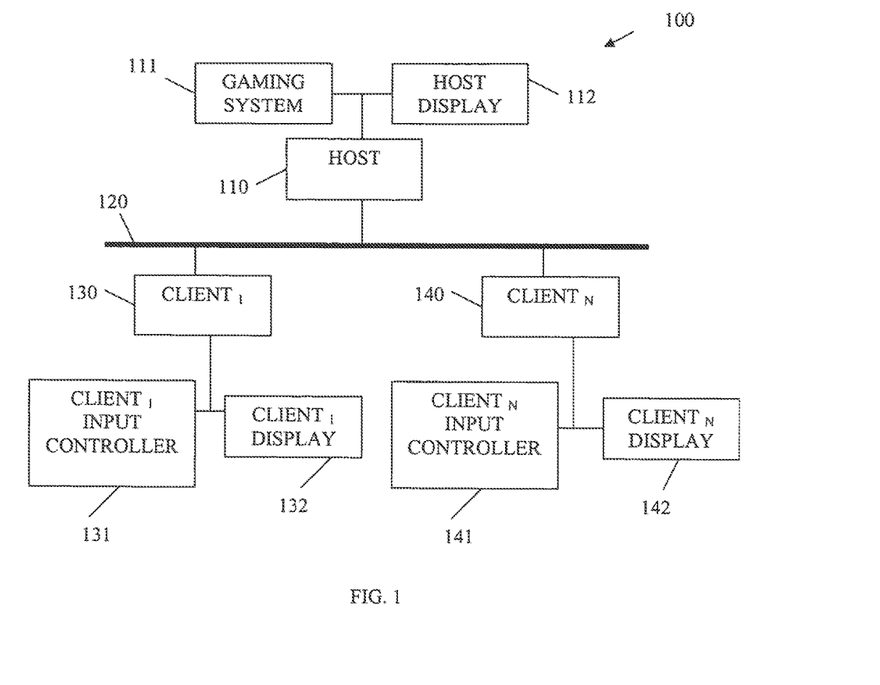
FIG. 1 is a diagram of an example architectural layout of a remote gaming and projection system, according to an example embodiment of the invention.

FIG. 1 is a diagram of one example architectural layout 100 of a remote gaming and projection system, according to an example embodiment of the invention. The architecture 100 is implemented in a machine-accessible and readable medium and is operational over a network. The network may be hardwired, wireless, or a combination of hardwired and wireless. Moreover, the network may be a Wide Area Network (WAN), a Local Area Network (LAN), or a home-based network.

The architecture 100 includes a variety of components, such as a host 110, a gaming system 111, an optional host display device 112, a network 120, and one or more clients 130 and 140. The host 110 is a processing device which houses and processes the gaming system 111. The gaming system 111 can be any commercially available gaming system 111 (e.g., Xbox, Nintendo, Play Station, Game Boy, Gaming PC, etc.) or custom-developed gaming system 111. In one layout of the components, the gaming system 111 and host 110 are also interfaced to a host display 112.

The gaming system 111 interacts with one or more client devices 130 and 140 over a network 120. Communication over the network 102 may be done via wireless protocols or hardwired protocols. The client devices 130 and 140 are smaller interface devices that merely communicate instructions or commands to the gaming system 111. That is, the features of any particular game associated with the gaming system 111 process on the host device 110 and not on the client devices 130 and 140.

In one embodiment, each client device 130 and 140 also include an input controller 131 and 141. The input controllers 131 and 141 are interfaced directly to the client devices 130 and 140 and provide for user interaction with a game that is playing on the gaming system 111. For example, the input controllers 131 and 141 may be joysticks or other types of game controllers 131 and 141, which are connected via wires and interfaces to the client devices 130 and 140 or which are connected wireless via interfaces to the client devices 130 and 140.

Each client device 130 and 140 is also associated with its own display device 132 and 142. The display devices 132 and 142 are real-time and dynamic projections of the output being produced by an executing gaming system 111. This can be achieved by projecting the presentations of images and video being presented on the host display 112 over the network 120 to the client displays 132 and 142. Alternatively, this can be achieved by streaming output produced by the gaming system 111 over the network to the client devices 130 and 140, where the client devices 130 and 140 buffer, optionally decompress, and play the streamed output on the client displays 132 and 142.

During game play an example illustration of interactions between the components of the architecture 100 may be as follows. A game player powers up a small interface device identified as a client device 130 and grabs an input controller 131. Next, the client device 130 contacts a main menu for the gaming system 111 over the network 120 and projects the main menu back over the network to the client 130, which feeds the images directly to a client display (e.g., television monitor). The game player then begins to interact with the images and embedded selections of the main menu which is presented on the client display 132 using the input controller 131. The input controller 131 communicates selections to the client device 130, which relays them to the gaming system 111 over the network 120. In response to the selections, the gaming system 111 updates selections or images which are streamed back to the client 130 over the network 120 and dynamically presented on the client display 132. The game player believes he/she is directly interacting with a gaming system 111 that is local to his/her client display 132. In fact, the entire gaming system 111 is remotely located in a central location and is not in proximity to the client 130 or the client display 132.

Arrangements and processing associated with the architecture 100 permits the manufacturing and development of smaller and less obtrusive client devices 130 and 140, which acts as interface conduits to gaming systems 111 that are centrally hosted on hosts 110 over a network 120. Thus, a home gaming system 111 may reside in a single location and service an entire home network having a client devices 130 and 140 and client displays 132 and 142 dispersed throughout the household at various locations.

In some alternative arrangements of the architecture 100, the host 110 may be any processing device having a host display 112. An application processes on the host 110 and desires to project the presentations of the host display 112 to one or more displays 132 and 142 of clients 130 and 140 over a network 120. In these embodiments, the host 110 may register or initially negotiate a projection session with a logical projection device.

The projection device is logical because it does not have to be directly connected (hardwired) to the host display 112 as is conventionally the case with conventional projection devices; rather, the host 110 uses standard network connections and protocols to establish a projection session the logical projection device. The logical projection device then monitors and dynamically communicates images appearing on the host display 112 to one or more client displays 130 and 140. In this manner, expensive and bulky projection devices are avoided and a host 110 may dynamically share its host display 112 with a plurality of client displays 132 and 142. In this way multiple entertainment sources such as games or movies can be remotely accessed from any display on the network.

Figure 2:
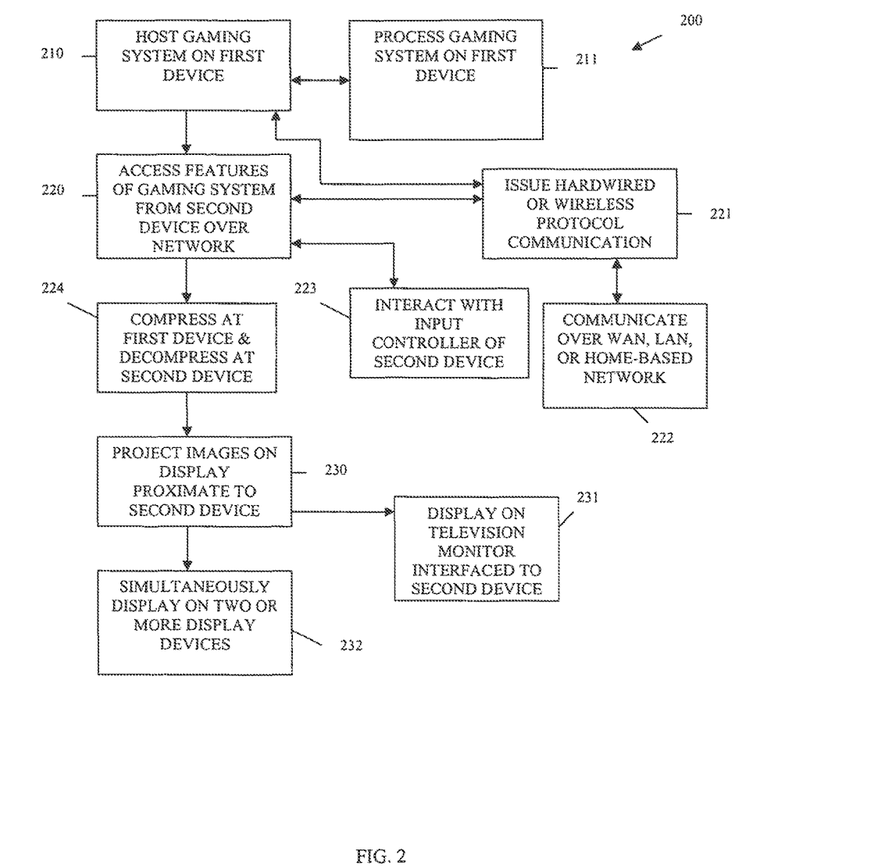
FIG. 2 is a diagram of a method for remote gaming and projection, according to an example embodiment.

FIG. 2 is a diagram of one method 200 for remote gaming and projection, according to an example embodiment. The method 200 (hereinafter "processing") is implemented in a machine-accessible and readable medium and is enabled through network arrangements, protocols, and resources to communicate over a network. The network may be hardwired, wireless, or a combination of hardwired and wireless. Additionally, the network may be a WAN, LAN, and/or home-based network.

Initially, at 210, a gaming system is hosted on a first device over a network. This means that the gaming system is processed, at 211, on the first device and enabled to communicate via network protocols (wireless or hardwired). That is the gaming system is modified to receive and transmit commands via network protocols. In some instances, the gaming system may be modified using a middle layer application that translates commands received over a network into formats that an unmodified version of the gaming system recognizes and packages information outputted by the unmodified gaming system into network formats that a client device can interpret and process. Thus, the gaming system itself may not have to be modified at all in order to be enabled over a network. Still, modification to the gaming system to enable it to process over a network may be one embodiment of the invention.

At 220, features of the gaming system are accessed over the network, where those features are identified by and originate with a second device. In some embodiments, the second device is the client devices 130 and 140 described above with the architecture 100 of FIG. 1. The second device may issue hardwired or wireless protocol communications, at 221, to identify the features and communicate with the gaming system. Again, at 222, the network itself may be a WAN, LAN, and/or home-based network.

In some embodiments, the second device also includes an input controller, such as the input controllers 131 and 141 of the architecture 100 of FIG. 1. At 223, the input controller is manipulated or controlled by a game player or user and communicates with the second device. Thus, a game player interacts with a particular game executing within the gaming system by using an input controller (game controller). The game controller communicates with the second device, and the second device identifies selections of features (commands or operations) of the game in network communications which are sent over the network to the gaming system for processing. The game player believes the gaming system is local to the second device, but the second device is only an intermediary between the input controller and the gaming system that resides in a remote location from the second device and is not in close proximity to the gaming system.

The second device also receives continuous and dynamic output from the gaming system. This output represents states of the game being played by a game player and is typically represented as a series or stream of images that continuously change to form a video having audio as well. The output from the gaming system is streamed over the network from the gaming system to the second device. The second device feeds this or plays this on a client display, such as a television, that is local to the second device.

In one embodiment, at 224, the outputted images and/or audio associated with the gaming system may be compressed on the host of the gaming system before being streamed to the second device. In these embodiments, at 224, the compressed images and/or audio are decompressed on the second device before being played to the client display.

As a result, at 230, the images, video, and/or audio produced as regular output by the gaming system is projected onto a display that is local to the second device. That is, the display is proximate or in close proximity to the second device. As was mentioned above and again at 231, the display may be a typical television monitor which is interfaced or connected to the second device, such as through an audio/video cord and inputs available on the second device and the television monitor.

In one embodiment, at 232, the output of the gaming system may be simultaneously projected to two or more display devices. The plurality of displays may be associated with a single second device or may be associated with two or more different second devices, where each second device is interfaced over the network to the gaming system. In this way, a single game executing within the gaming system may support a plurality of geographically dispersed garners, where each game player has their own second device and display device proximate to their second device.

It is also worth noting that with the teachings of method 200, conventional hardware associated with gaming systems may be eliminated entirely, if desired. That is, gaming software may be hosted on web sites or servers and the second devices, client devices may be used as small less obtrusive interface devices that select, rent, buy, and play games which are then installed and played remotely on the gaming systems remote server. This would eliminate a lot of bulky equipment and devices and would provide garners with access to a vastly richer set of available games, while not impacting the gaming experience of the game players. It would also provide a new revenue stream for game makers to rent or temporarily license different games, which might not have otherwise been purchased by game players. Moreover, distribution is streamlined since games do not have to be physically shipped to game players for game play.

Figure 3:
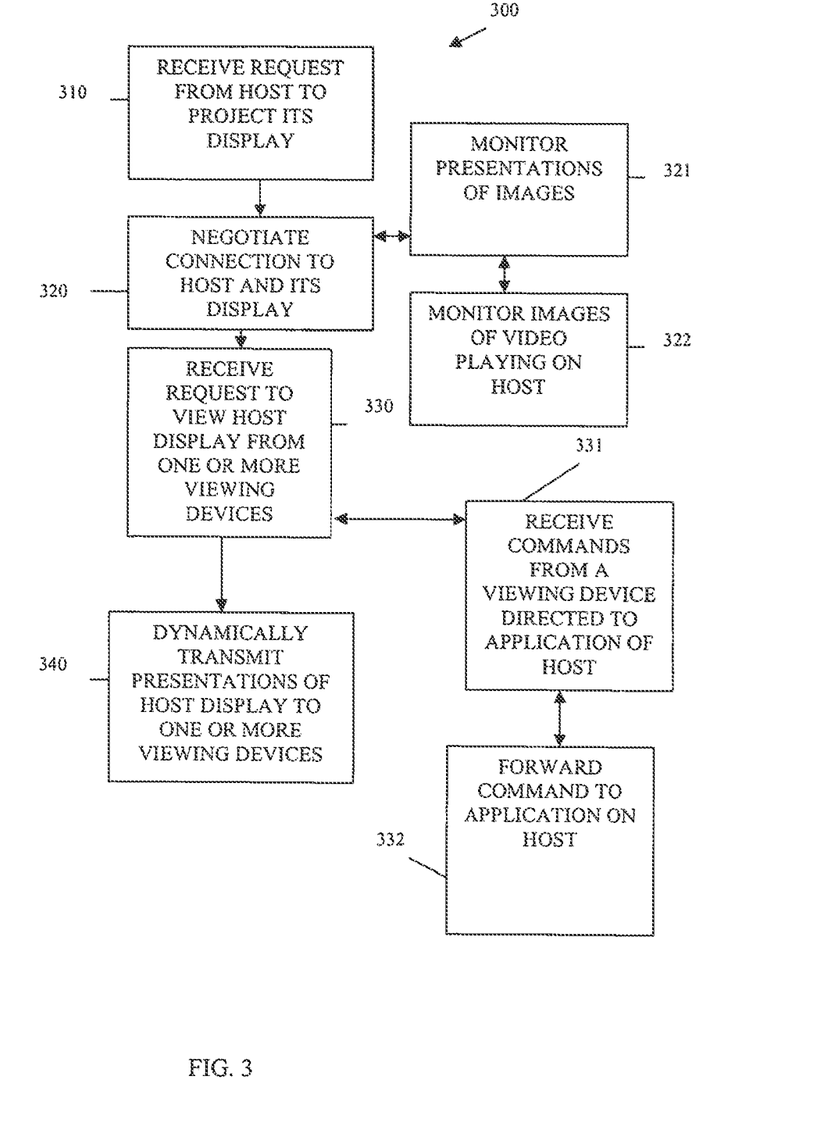
FIG. 3 is a diagram of a method for remote projection, according to an example embodiment.

FIG. 3 is a diagram of a method 300 for remote projection, according to an example embodiment. The method 300 (hereinafter "logical projection device") is implemented in a machine-accessible and readable medium and is enabled to process over a network. The network may be hardwired, wireless, or a combination of hardwired and wireless.

At 310, the logical projection device receives a request from a host to project a display of the host to one or more viewing devices. A viewing device may be a television, a conventional projector, a processing monitor associated with a processing device, and the like. The request received from the host is obtained over normal network transactions. That is, the host and the logical projection device do not have to be directly connected and hardwired to one another. Essentially, the logical projection device and the host are two resources on a network that communicate with one another via normal and typical network protocols.

Once the request is received, at 320, the logical projection device and the host negotiate a logical network connection between the logical projection device and a display of the host. That is, at 321, the logical projection device begins monitoring presentations of images occurring on the host display, or monitors, at 322, video and/or audio being played on the host. One technique for doing this is for the host to identify the port associated with its host display and provide access to that port over the network to the logical projection device. In this way, the logical projection device can monitor and detect changes in the presentations occurring on the host display and can acquire those changed presentations for delivery to other viewing devices.

At some point after the logical projection device and the host negotiate a projection session, the logical projection device, at 330, receives one or more requests from one or more viewing devices that desire to view the presentations being monitored on the host display of the host. In one embodiment, these requests are received from the one or more viewing devices after being invited to view the presentations by the host and/or the logical projection device.

That is, as part of the negotiation, at 320, the host may identify viewers that may permissibly view or are to receive notice that viewing is available. Alternatively, the host may independently notify viewers of the availability of the presentations via the logical projection device. In one embodiment, the logical projection device sends a link to each of the one or more potential viewers, and when a particular viewer activates the link, the logical projection device negotiates a projection session with the activating viewer's port for its viewing device and begins streaming the presentations of the host display to the viewing display device.

In some embodiments, at 331, the logical projection device may also serve as a more intelligent intermediary between the host and a viewing device, such that the viewing device can issue commands that are received by the logical projection device, where those commands are directed towards an application processing on the host. That application may be driving the presentations appearing on the host display device. In these embodiments, at 332, the logical projection device forwards received commands to the application processing on the host. In this sense, the logical projection device when interfaced to a viewing device associated with a gaming system application of the hosts may facilitate remote gaming in the manners presented above with method 200.

At 340, the presentations being captured on the host display are dynamically transmitted by the logical projection device to display devices associated with the one or more viewing devices. Transmission to the viewing device may be achieved via multicasting, unicasting, broadcasting, or other transmission techniques.

Figure 4:
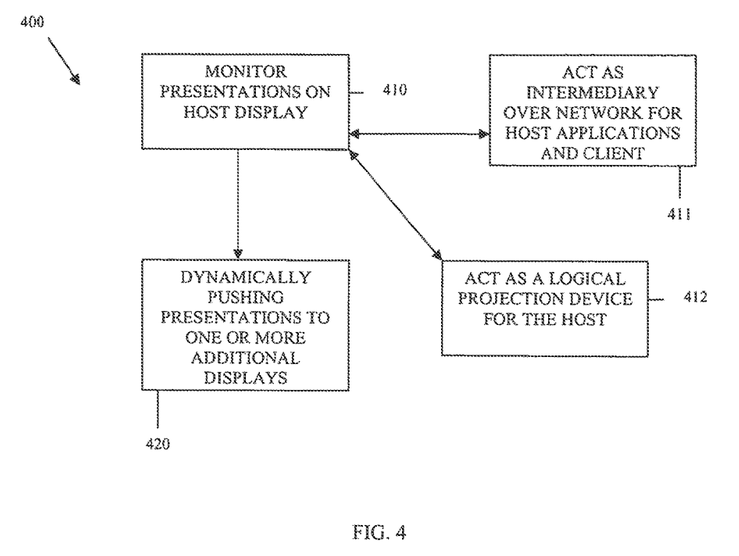
FIG. 4 is a diagram of another method for remote projection, according to an example embodiment.

FIG. 4 is a diagram of one method 400 for remote projection, according to an example embodiment. The method 400 is implemented in a machine-accessible and readable medium. The method 400 is represented as instructions that when executed perform the processing of the method 400 that is depicted in FIG. 4.

The instructions do not have to reside on a single medium. That is, the instructions may reside on a plurality of different media and logically associated with one another when executed. Moreover, the medium may be removable, permanent storage associated with one or more devices, and/or memory associated within the one or more devices. In one embodiment, the medium is removable and interfaced to one or more processing devices where the instructions are uploaded to the devices, loaded, and initiated to perform the processing of the method 400. In another embodiment, the medium is downloaded from a remote device to another device where the instructions are loaded and initiated to perform the processing of the method 400.

In some embodiments, the instructions are installed on a server and represent a remote gaming system's operation and interaction with one or more client devices. In another embodiment, the instructions are installed on a device and that device is interfaced to a network which is in communication with a host and one or more clients over the network. Operation of the instructions on the device provides a remote gaming interface.

At 410, the instructions monitor presentations occurring on a display of a host. One technique for doing this is to negotiate with a host for purposes of monitoring ports associated with the displays presentations. In some embodiments, audio ports associated with the host are also monitored. Thus, the host display and its presentations are intended to include audio devices and audio ports associated with the host display and used with presentations occurring on the host display.

At 420, these monitored presentations are dynamically pushed or projected to one or more additional display devices associated with one or more additional clients. The presentations are communicated over a network using traditional network arrangements, resources, and/or protocols. Moreover, a single client may be associated with more than one client display device. The clients are viewers of the monitored and captured presentations occurring on the host display. The host interfaces with the instructions using conventional network communication and does not have to be directly hardwired to a device processing the instructions of the method 400.

In one embodiment, at 411, the instructions also act as an intermediary over the network between host applications processing on the host and applications processing on the client. In this manner, the instructions which are enabled to act as a network intermediary may facilitate remote gaming in the manners presented above with respect to FIGS. 1 and 2.

In another embodiment, at 412, the instructions act as a logical projection device for the host. In this manner, the instructions may perform the operations and services presented above with respect to method 300 of FIG. 3.

Figure 5:
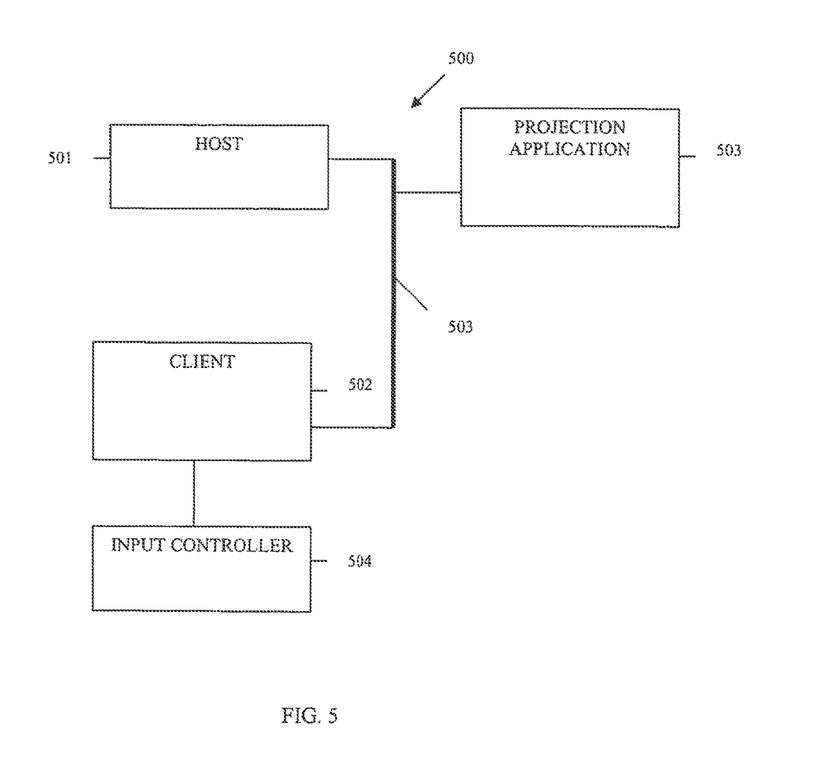
FIG. 5 is a diagram of a remote projection system, according to an example embodiment.

FIG. 5 is a diagram of one remote projection system 500, according to an example embodiment. The remote projection system 500 is implemented in a machine-accessible and readable medium and is enabled to be accessed and communicate over a network. The network may be hardwired, wireless, or a combination of hardwired and wireless. Moreover, in some embodiments, the remote projection system 500 implements at least a portion of the processing described above with respect to methods 200, 300, and 400.

The remote projection system 500 includes a host 501, a client 502, and a network 503. Optionally, the remote projection system 500 may also include a projection application 503 and an input controller 504. The host 501 is a processing device, which may or may not have a display device interfaced thereto. The host 501 may process a variety of applications and systems. In one embodiment, the host 501 processes a gaming system, such as the gaming system 111 of FIG. 1. The host 501 is interfaced to and enabled with the network 503 for purposes of providing output and receiving instructions or commands over the network 503.

The client 502 is also a processing device which is interfaced to a client display. Furthermore, the client is interfaced to and enabled with the network 503 for purposes of receiving output from the host 501 and providing instructions or commands to the host 501 over the network 503. In some embodiments, the client's display is a television, a projector, or a monitor associated with the client 502.

The network 503 may be a WAN, LAN, and/or a home-based network. The network 503 may be an insecure network, such as the Internet or may be a secure network over an insecure network such as a Virtual Private Network (VPN). The host 501 and the client 502 communicate with one another over the network 503 using conventional hard-wired or wireless protocol communications.

During operation of the remote projection system 500. The host 501 or the client 502 desire to communicate the presentations (images and/or audio) appearing on the host display with a client display of the client 502. In one embodiment, the host 501 utilizes the services of a projection application 503 to achieve this, where the projection application monitors the audio and visual ports of the host 501 and capture the presentations and package them and transmit them over the network 503 to the ports of the client 502 associated with the client's display. The presentations are dynamically pushed from the host 501 to the client 502 over the network.

The client 502 may also issue commands over the network 503 to one or more applications processing on the host 501. One such collection of applications that may process on the host 501 is a gaming system, such as the gaming system 111 of FIG. 1. The client 502 may also include an input controller 504, such as a gaming controller that interfaces directly to the client 502. The input controller 504 permits a game player to view the presentations of the gaming system processing on the host 501 via the client's display. The game player then manipulates or interacts with the input controller 504 to communicate commands to the gaming system via the client 502 and over the network 503 to the host 501. In this manner, the remote projection system 500 permits remote gaming.

Figure 6:
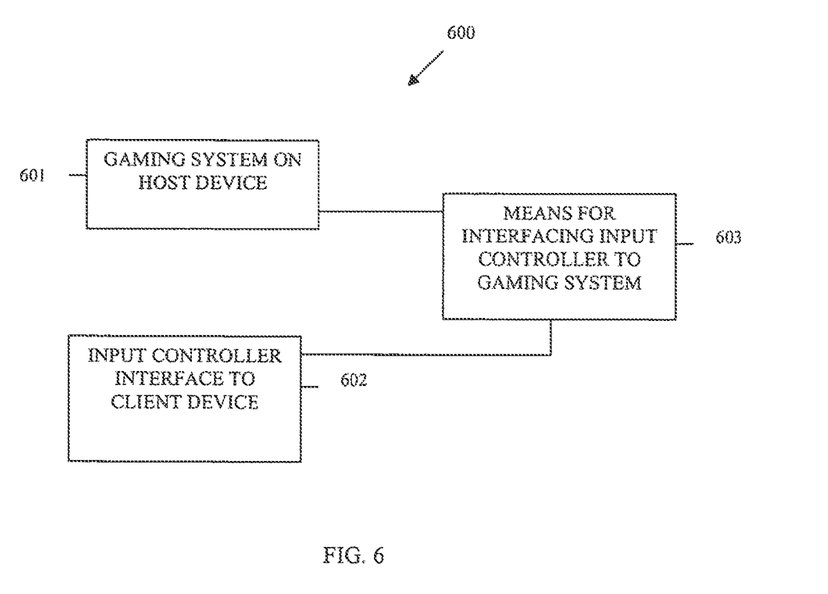
FIG. 6 is a diagram of a remote gaming system, according to an example embodiment.

FIG. 6 is a diagram of one remote gaming system 600, according to an example embodiment. The remote gaming system 600 is implemented in a machine-accessible and readable medium and is enabled to be processed over a network. In some embodiments, the remote gaming system 600 includes techniques processed by the methods 200, 300, and/or 400 of FIGS. 2-4.

The remote gaming system 600 includes a gaming system processing on a host device 601, an input controller interfaced locally to a client device 602, and a means for interfacing the input controller 602 to the gaming system 601 over a network. The gaming system 601 is either modified to communicate and receive network communications or interfaced to a middleware application that performs the network enablement of the gaming system 601. In other words, the middleware application translates output from the gaming system 601 and communicates it over a network, and translates commands received from the network on behalf of the gaming system 601 into formats that the gaming system 601 recognizes and may process.

The input controller 602 is interfaced to a client device that acts as a conduit for exchanged between the gaming system 601 and the input controller 602 over the network. A game player interacts or activates the input controller 602 in response to presentations occurring on the client's display. The presentations are generated as output by the gaming system 601. The game player believes or experience game play with the gaming system 601 as if the gaming system 601 were local and proximate to the game player and his/her client device. In fact, the input controller 602, the client device, and the gaming system 601 are interfaced together through a means for interfacing 603.

The means for interfacing 603 is any technique or combinations of techniques that monitor and track interactions of the input controller 602, associated with the client device, and transmits those interactions as commands or feature selections over the network to the gaming system 601 on the host device. The means for interfacing 603 also monitors output or optionally a display of the host having presentations. The output or presentations are produced by the gaming system 601 on the host device, the means for interfacing 603 monitors, traps, and records this output or presentations, packages it and transmits it over the network to the client device. The client device decompresses it, if necessary, and plays it on the client display.

The result is that the game player believes that he/she is using the input controller 602 to play a game associated with the gaming system on his or her client device. In fact, the game is being played remotely over a network through the facilitation of the means for interfacing 603, where the game is actually being played on a gaming system processing on a remote host device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method comprising:
accessing, by a first device, features of a system that executes on a second device, wherein accessing the features of the system is performed over a network using Internet Protocol communication;
receiving, by the first device over the network using Internet Protocol communication, first images in a session of the system, wherein the first images are generated at the second device for display at the second device, wherein the first images are captured based on a video image of the second device, and wherein the first images include images containing content modified by interaction between the second device and a third device in the session over the network using Internet Protocol communication, the interaction caused by selections made by a user at the third device with respect to images of the session presented on a second display device interfaced to the third device; and presenting the first images for the session on a first display device interfaced to the first device, wherein the first images are also to be projected for the session on the second display device interfaced to the third device.

2. The method of claim 1, wherein the first, second, and third devices are geographically dispersed and separated by the network.

3. The method of claim 1, wherein presenting the first images comprises presenting control elements selectable by a user at the first device to access the features of the system, the method further comprising:

communicating indications of selections of the control elements from the first device to the second device over the network using Internet Protocol communication.

4. The method of claim 1, wherein accessing the features of the system that executes on the second device comprises accessing the features of the system that executes at a web site including the second device.

5. The method of claim 1, wherein accessing the features of the system over the network comprises accessing the features of the system over an Internet network.

6. The method of claim 1, wherein receiving the first images comprises receiving compressed images, the method further comprising:

decompressing the compressed images to produce decompressed images, wherein presenting the first images comprises presenting the decompressed images on the first display device.

7. The method of claim 1, further comprising:

receiving an indication of activation of an input device at the first device, wherein the activation relates to the session; and sending a command over the network using Internet Protocol communication to the second device, where the command relates to the activation of the input device.

8. The method of claim 1, wherein receiving the first images comprises receiving the first images that are part of a gaming session of a gaming system executed on the second device.

9. The method of claim 1, wherein the first images are presented on the first display device interfaced to the first device simultaneously with presentation of the first images on the second display device interfaced to the third device.

10. The method of claim 1, wherein the system that executes on the second device comprises an application that executes on the second device.

11. A first device comprising:

an interface to communicate over an Internet network with a second device; and a processor to:

access, based on communication over the Internet network, features of a system that executes on the second device;

receive, over the Internet network, first images in a session of the system, wherein the first images are generated at the second device for display at the second device, where the first images are captured based on a video image of the second device, and wherein the first images include images containing content modified by interaction between the second device and a third device in the session over the Internet network, the interaction caused by selections of control elements made by a user at the third device with respect to images of the session presented on a second display device interfaced to the third device; and present the first images for the session on a first display device interfaced to the first device, wherein the first images are also to be presented for the session on the second display device interfaced to the third device.

12. The first device of claim 11, wherein the first device is geographically dispersed from the second and third devices.

13. The first device of claim 11, wherein the first images to be presented on the first display device include control elements selectable by a user at the first device to access the features of the system, wherein the processor is to further:

communicate indications of selections of the control elements in the first images from the first device to the second device over the Internet network.

14. The first device of claim 11, wherein the features accessed are of the system that executes on the second device at a web site.

15. The first device of claim 11, wherein the first images are part of a video associated with a gaming session of a gaming system executed on the second device.

16. The first device of claim 11, wherein the processor is to further:

receive audio data from the second device, wherein the audio data is related to the first images and is based on audio at the second device.

17. The first device of claim 11, wherein the presenting of the first images on the first display device interfaced to the first device occurs simultaneously with presentation of the first images on the second display device interfaced to the third device.

18. A non-transitory machine-readable storage medium storing instructions that upon execution cause a first device to:

access features of a system that executes on a second device, wherein accessing the features of the system is performed over a network using Internet Protocol communication;

receive, over the network using Internet Protocol communication, first images in a session of the system, wherein the first images are generated at the second device for display at the second device, wherein the first images are captured based on a video image of the second device, wherein the first images include images containing content modified by interaction between the second device and a third device in the session over the network using Internet Protocol communication, the interaction caused by selections made by a user at the third device with respect to images of the session presented on a second display device interfaced to the third device; and present the first images for the session on a first display device interfaced to the first device, wherein the first images are also to be presented for the session on the second display device interfaced to the third device.

19. The non-transitory machine-readable storage medium of claim 18, wherein presenting the first images comprises presenting control elements selectable by a user at the first device to access the features of the system, wherein the instructions upon execution cause the first device to further:

communicate indications of selections of the control elements to the second device over the network using Internet Protocol communication.

20. The non-transitory machine-readable storage medium of claim 18, wherein accessing the features of the system over the network comprises accessing features of a gaming system over the network.

\* \* \* \* \*